United States Patent
Tatourian et al.

(10) Patent No.: US 9,817,676 B2
(45) Date of Patent: Nov. 14, 2017

(54) COGNITIVE PROTECTION OF CRITICAL INDUSTRIAL SOLUTIONS USING IOT SENSOR FUSION

(71) Applicant: McAfee, Inc., Santa Clara, CA (US)

(72) Inventors: Igor Alan Tatourian, Santa Clara, CA (US); Alex Nayshtut, Gan Yavne (IL); Oleg Pogorelik, Lapid (IL); Simon Hunt, Naples, FL (US)

(73) Assignee: McAfee, Inc., Santa Clara, CA (US)

( * ) Notice: Subject to any disclaimer, the term of this patent is extended or adjusted under 35 U.S.C. 154(b) by 88 days.

(21) Appl. No.: 14/747,406

(22) Filed: Jun. 23, 2015

(65) Prior Publication Data

US 2016/0381071 A1    Dec. 29, 2016

(51) Int. Cl.
*G06F 9/44* (2006.01)
*H04L 29/06* (2006.01)

(52) U.S. Cl.
CPC .......... *G06F 9/442* (2013.01); *H04L 63/1425* (2013.01)

(58) Field of Classification Search
CPC ...... H04L 63/18; H04L 63/1425; G06F 9/442
USPC .......................................................... 726/23
See application file for complete search history.

(56) References Cited

U.S. PATENT DOCUMENTS

| | | |
|---|---|---|
| 2009/0234468 A1 | 9/2009 | Doi et al. |
| 2010/0198690 A1 | 8/2010 | Gilvar et al. |
| 2012/0255019 A1 | 10/2012 | McNamee et al. |
| 2014/0052849 A1 | 2/2014 | Sabin |
| 2014/0082739 A1* | 3/2014 | Chess .............. G06F 21/577 726/25 |
| 2014/0283065 A1* | 9/2014 | Teddy ............... H04L 63/145 726/23 |
| 2015/0121449 A1* | 4/2015 | Cp .................. H04L 63/145 726/1 |

FOREIGN PATENT DOCUMENTS

WO    2004-095195 A2    11/2004

OTHER PUBLICATIONS

International Search Report and Written Opinion regarding corresponding PCT application No. PCT/US2016/033505, dated Aug. 29, 2016.

* cited by examiner

*Primary Examiner* — Kambiz Zand
*Assistant Examiner* — Benjamin Kaplan
(74) *Attorney, Agent, or Firm* — Blank Rome, LLP

(57) ABSTRACT

A technique for cognitive protection of a system can include digital and analog sensors to measure or calculate operational parameters of a system. Digital sensors may be used to determine measured or primary operational parameters. The analog sensors are used to measure analog sensor information related to operation of the system. Analog sensor information that is measured may be used to calculate secondary operational parameters that includes the same operating parameters as the primary operational parameters. Lockstep analysis may be used to compare the primary operational parameters with the secondary operational parameters so as to determine a discrepancy in the operational parameters in the system.

21 Claims, 7 Drawing Sheets

COGNITIVE PROTECTION OF CRITICAL INDUSTRIAL SOLUTIONS USING IOT SENSOR FUSION

TECHNICAL FIELD

Embodiments described herein generally relate to security in networks, and more particularly to techniques for protecting Internet-of-Things (IoT) networks from advanced threats by performing sensor fusion of sensors data that is received over an independent channel.

BACKGROUND ART

The Internet of Things (IoT) is based on the idea that industrial and consumer solutions, not just computers and computer networks, can be readable, recognizable, locatable, addressable, and controllable via an IoT communications network (e.g., an ad-hoc system or the Internet). IoT devices in industrial and consumer systems, for example, IoT sensors and IoT components, are also accessible over the Internet and, therefore, vulnerable to malware. A cyberattack on an IoT critical infrastructure in an industrial system can cause significant physical damage and/or threaten human life if compromised. For example, a cyberattack on an IoT utility infrastructure that uses a nuclear power plant could target critical sub-systems and potentially cause blackouts, plant explosions, or even a nuclear meltdown in a centrifuge. Recently, the stuxnet virus, which is an example of an industrial malware, was used to target programmable logic controllers (PLCs) in a nuclear reactor and cause severe damage to property. The stuxnet virus targeted industrial software that controlled a nuclear reactor by exploiting a zero-day flaw or vulnerability to obtain control of the PLCs and cause a meltdown in the nuclear reactor. The stuxnet virus is just one example of an advanced malware threat where current antivirus solutions are not able to detect the malware. Similarly, in non-industrial systems such as those used in drive-by-wire vehicle systems onboard a vehicle, computer-controlled devices in vehicles, for example, brakes, engine, locks, or the like that are connected to an onboard network may be attacked by malware in order to gain access to the onboard network and compromise safe operation of the vehicle.

An advanced malware threat is capable of circumventing traditional prevention controls, for example, anti-virus software, host-based intrusion prevention systems, or the like, and modifying the behavior of industrial and non-industrial systems. Existing antivirus security software is unable to defend against these advanced malware threats since anti-virus signatures are not yet available to antivirus software developers. All systems, industrial and non-industrial, are vulnerable to attacks if they are connected to a network—be it an internal network or an external network. Current security software does not adequately protect these systems from advanced malware threats, as illustrated above. Therefore, a way of protecting against advanced malware threats in critical industrial and non-industrial solutions would be desirable.

DESCRIPTION OF EMBODIMENTS

Figure 1:
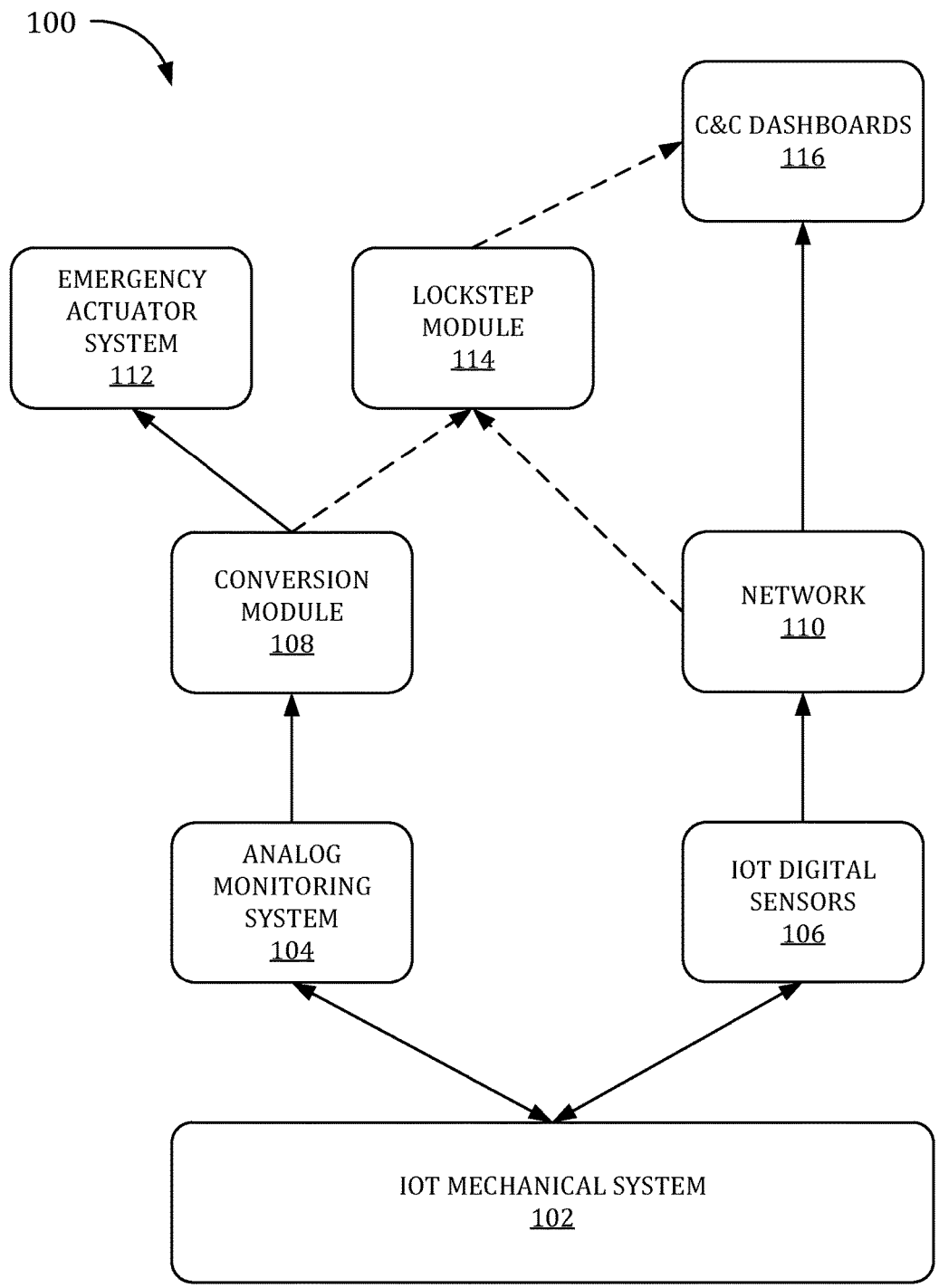
FIG. 1 illustrates a schematic dataflow diagram of a system that is configured to perform cognitive protection of a monitored system according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "cognitive analysis" can refer to using data from one or more sensors or data derived from the one or more sensors in order to represent sensors data into different meaningful and comparable parameters.

As used herein, the term "Internet of Things (IOT)" can refer to a network of physical objects or "things" embedded with electronics, software, sensors and connectivity to enable it to exchange data with other connected devices in the network. Each thing in the network is an IoT device that can be uniquely identifiable through its embedded computing system but is able to interoperate within the existing Internet infrastructure.

As used herein, the term "trusted execution environment" can refer to a set of CPU instructions that provides secure execution services to an operating system. The trusted execution environment allows software to define a safe, isolated execution space within the hardware of a larger system. Controls on this execution space allow operations to be executed without being observed or influenced by unauthorized software such as malware. Multiple of these execution spaces may exist on the system at once, and each has dedicated resources that are managed by the processor, chipset and OS kernel.

A technique for cognitive protection of a system from malware attacks can include industrial and non-industrial systems that are connected to a network. The system may include digital and analog sensors that may be used to determine measured and/or calculated operational parameters of the system. The digital sensors are connected to a network and may communicate one or more primary operational parameters of the system over primary channels. The analog sensors are used to measure analog sensors information related to operation of the system. The analog information may be converted to digital information and communicated over an independent channel and isolated from the primary channels. Cognitive analysis may be used to determine secondary operational parameters of the system using the analog sensors information. The secondary operational parameters include the same operating parameters as those of the primary operational parameters but are determined using other means such as, for example, using analog sensors data. Further, lockstep analysis may be used to compare the primary operational parameters with the secondary operational parameters so as to determine discrepancies in the system.

FIG. 1 illustrates a schematic dataflow diagram of a system 100 for implementing cognitive protection for detecting advance malware threats using fusion of IOT sensors, according to an embodiment of the invention. System 100 may include an IOT mechanical system 102, analog monitoring system 104, IOT digital sensors 106, conversion module 108, network 110, emergency actuator system 112 and command and control (C&C) dashboard 116. System 100 may also include an optional lockstep module 114. The IOT mechanical system 102, IOT digital sensors 106, network 110 and C&C dashboards 116 may include traditional security software, for example, anti-virus software or anti-malware mechanisms to defend against malware and virus threats to system 100 that may target IOT digital sensors 106 over network 110 so as to, in one example, conceal actual operating conditions or parameters of IOT mechanical system 102. Network 110 is not limited to a network of interconnected computer networks that use an internet protocol (TCP/IP) such as the Internet, and can also include other data networks and/or telecommunications networks that are configured to pass information back and forth to system 100.

As shown in FIG. 1, IOT mechanical system 102 may represent a monitored system with a plurality of IOT devices that may be used in either an industrial system or a non-industrial system. IOT mechanical system 102 with its plurality of IOT devices may be addressable and accessible over network 110. In an embodiment, IOT mechanical system 102 is connected to a plurality of IOT digital sensors 106 that may determine digital information for a set of primary or measured vital system health indicators ("VSHIs") of IOT mechanical system 102. IOT digital sensors 106 may also be addressable and accessible over network 110. In an embodiment, IOT digital sensors 106 are the primary sensors that may determine one or more various operating parameters and/or operating variables. In an example, the IOT digital sensors 106 may provide the primary or measured VSHIs for IOT mechanical system 102 over network 110 (hereinafter "primary channels"). As used herein, VSHIs are a minimal set of monitored functionalities of IOT mechanical system that are related to health and operation of IOT mechanical system 102 whereby exertion may result in severe damage to IOT mechanical system 102 and/or potentially cause harm to users or the environment, in the vicinity of IOT mechanical system 102. In an embodiment, IOT digital sensors 106 may determine the primary or measured VSHIs in digital form. The IOT digital sensors 106 may provide the primary or measured VSHIs to a command and control (C&C) dashboard 116 over one or more primary communication channels (hereinafter "primary channel") via network 110.

System 100 may also include an analog monitoring system 104. Analog monitoring system 104 may include a plurality of analog sensors that are associated with monitored equipment 102. Analog sensors may include audio sensors, video sensors, pressure sensors, ultrasound sensors or the like that are configured to sense operating parameters and/or variables of IOT mechanical system 102 and store the sensed parameters as analog sensor data. Analog monitoring system 104 is configured to communicate the analog sensor data over one or more independent channels (hereinafter "secondary channels") to conversion module 108. The secondary channels may also be connected to network 110, however, may be isolated from the primary channels. In another embodiment, analog sensor data may communicate analog data over another network that is isolated from network 110. In an embodiment, secondary independent channels may be hard-wired to communicate analog data or may wirelessly communicate analog data in network 110. As the secondary channel is isolated from primary channel that communicates the primary or measured VSHIs, it, therefore, cannot be detected by advanced malware that may have gained access to network 110.

Analog sensor data from analog monitoring system 104 may be transmitted to conversion module 108 for processing. Conversion module 108 uses cognitive analysis to create or derive a set of secondary or calculated VSHIs from the analog sensor data. The secondary or calculated VSHIs represents calculated VSHI information that is associated with operating parameters or variables of IOT mechanical system 102. In an embodiment, conversion module 108 may send the secondary or calculated VSHIs to an optional lockstep module 114 for comparison. The secondary VSHIs include similar parameters, variables or measurements as those of the primary or measured VSHIs. In an embodiment, conversion module 108 may include logic to determine if the secondary or calculated VSHIs are erroneous and an alert may be provided. An alert that is provided may be indicative of a malware attack on IOT mechanical system 102, which may be flagged and sent to an emergency actuator system 112 for shutting-down IOT mechanical system 102. In another embodiment, an optional lockstep module may be used to compare secondary or calculated VSHIs against the primary or measured VSHIs in order to determine discrepancies within IOT mechanical system 102.

An optional lockstep module 114 may receive secondary or calculated VSHIs from conversion module 108. Lockstep module 114 may include hardware and algorithms to process the primary and secondary VSHIs that are received over network 110. Lockstep hardware includes one or more processors, memories and algorithms that process the VSHIs that are received and flag an error in the case of a discrepancy. In one embodiment, lockstep module 114 may compare the respective measured VSHIs against the calculated VSHIs that are received over the primary and secondary channels ("channel matching") to determine a discrepancy. Lockstep module 114 may be configured to compare the primary VSHIs with the secondary VSHIs so as to determine if there is a discrepancy in VSHIs that may indicate a potential malware attack on IOT mechanical system 102. In another embodiment, lockstep module 114 may compare the secondary VSHIs against predetermined VSHIs that are stored in one or more memories in order to determine a discrepancy in the system. A discrepancy in the system may be flagged and an alert may be communicated from lockstep module 114 to C&C dashboard 116 in response to a discrepancy, which may result in shut-down of IOT mechanical system 102 for further analysis. The alert may be indicative of a malware threat on IOT mechanical system 102 by concealing accurate values of primary or measured VSHIs. Thus, using the secondary VSHIs and primary VSHIs provides protection against any malware threat to network 110. Any malware threats to network 110 may have to target all VSHI information that is calculated in system 100, which may be very difficult to existing malware. Malware may have to target all VSHIs that are communicated over both the primary channels and the secondary channels. Malware attack on primary channels to compromise primary VSHIs may have to identically target the secondary channels in order to compromise any secondary VSHIs that are communicated. However, cognitive analysis is used to determine these secondary VSHIs using measured sensor data, any malware threats that attack measured sensor data may find it very difficult to generate similar secondary VSHIs that may be used to attack system 100 Therefore, values of secondary or calculated VSHIs may represent uncompromised operating parameters for IOT mechanical system 102, which may be used to detect malware threats to network 110.

Emergency actuator system 112 may include one or more actuators, for example, programmable logic controllers (PLCs) or programmable automation controllers (PACs) that may be actuated to shut-down IOT mechanical system 102 in response to a discrepancy in the secondary VSHIs received from IOT mechanical system 102.

C&C dashboard 116 is configured to manage, command, direct or regulate the behavior of IOT mechanical system 102 from the VSHIs that are received by C&C dashboard 116. In an embodiment, C&C dashboard 116 can include programmable automation controllers (PACs), programmable logic controllers (PLCs), supervisory control and data acquisition (SCADA) systems, distributed control systems (DCS), or other smaller control system configurations that use data that is received from lockstep module 114 to communicate supervisory commands to IOT mechanical system 102.

Figure 2:
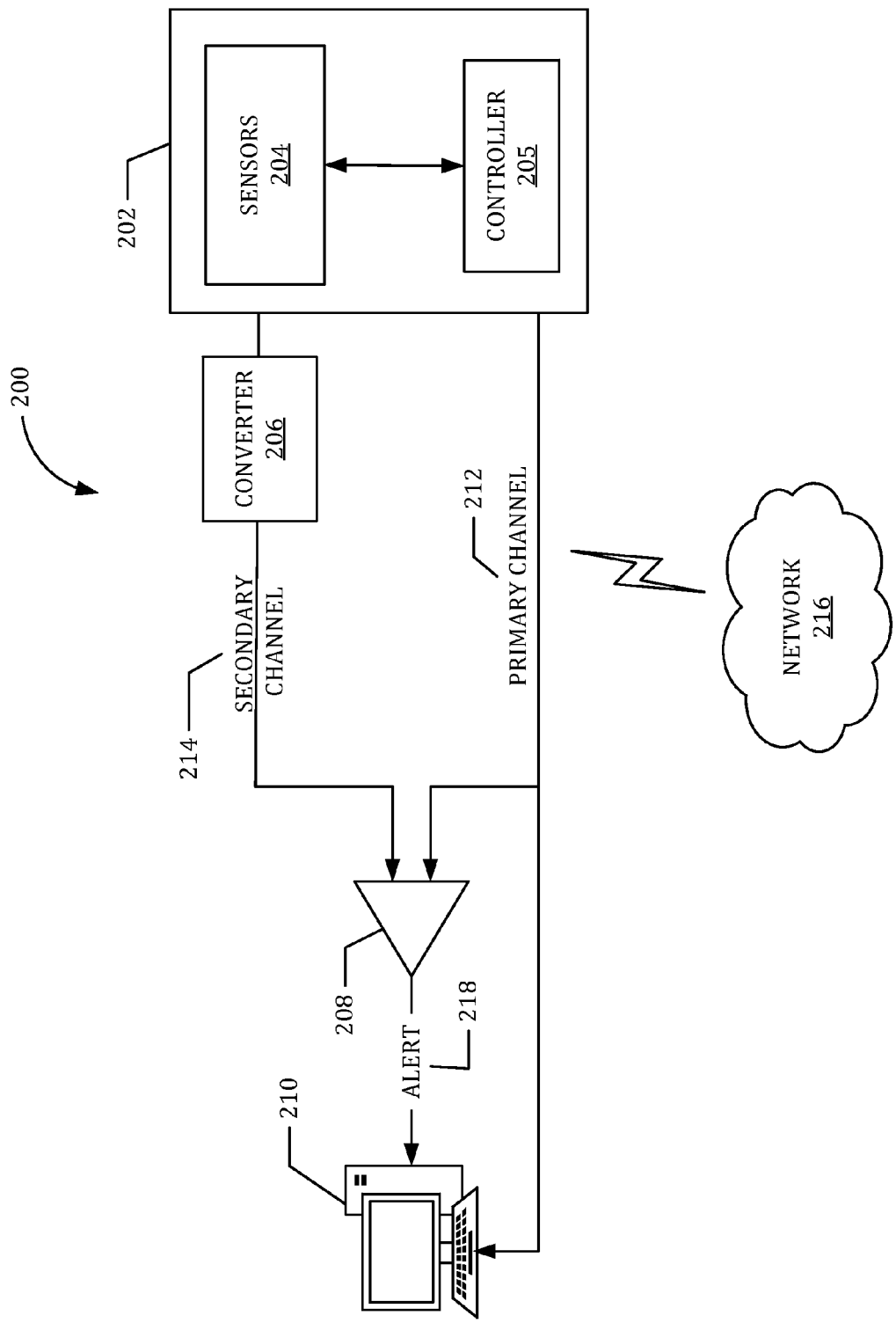
FIG. 2 illustrates a schematic block diagram of a system architecture for performing cognitive protection of an industrial system according to one embodiment.

FIG. 2 illustrates a schematic block diagram for performing cognitive protection of critical equipment from malware threats to an industrial system 200 such as, for example, a centrifuge in a nuclear power plant according to an embodiment of the invention. While system 200 is illustrated below for use with critical equipment in an industrial system, the principles described below are equally applicable to a non-critical system in an industrial system or a non-industrial system such as, for example, an engine control unit (ECU) in a vehicle system. In an embodiment, system 200 may use a plurality of sensor modalities to detect operational parameters of monitored equipment 202, for example, a centrifuge and may use cognitive analysis on the sensors data to protect against advanced malware threats.

System 200 is connected to a network 216 and may include monitored equipment 202, comparator system 208 and control system 210. In an embodiment, monitored equipment 202 may be a centrifuge in a nuclear reactor whose various safety-related parameters or variables are being monitored. Monitored equipment 202 can include sensors 204 that may sense one or more operational parameters of monitored equipment 202, for example, sense pressure, revolutions per minute (RPM), temperature, or the like for use in monitoring of one or more parameters or variables of monitored equipment 202.

In embodiments, sensors 204 may include digital sensors connected to monitored equipment 202. The digital sensors may measure one or more parameters of monitored equipment 202 and provide the sensed digital information to a microcontroller or processor 205 for processing. Microcontroller 205 may be configured to process the measured sensor data and determine primary or measured VSHIs (also referred to a "primary or measured parameters"). Primary channel 212 may be associated with network 216, such as a LAN, WAN or the like and may be used for communicating with and/or controlling monitored equipment 202. Microcontroller 205 may include processing hardware and logic for processing the sensor information and transmitting the primary VSHIs to comparator system 208 and control system 210 over primary channel 212. In an embodiment, primary channel 212 may be a wireless connection for transmitting the primary VSHIs to comparator system 208 and control system 210.

Sensors 204 may also include analog sensors that are associated with monitored equipment 202. Analog sensors can include audio sensors, video sensors, pressure sensors, ultrasound sensors or the like that are configured to independently measure sensor parameters of monitored equipment 202. In some non-limiting examples, an ultrasound sensor may measure sound vibrations of monitored equipment 202, an analog infrared image sensor may obtain still images or video images of monitored equipment 202, a directional microphone may measure an analog acoustic signal, or laser sensors may be used to trigger a photon counter to determine rotation of, for example, a centrifuge in monitored equipment 202. The analog sensor data from sensors 204 may be communicated to a converter 206 over a secondary channel 214. Secondary channel 214 may be a physical connection that is independent and isolated from primary channel 212. Secondary channel 214 may provide analog sensor data that is not generally used for measuring primary VSHIs and, therefore, may not be a target of an attack by malware that may have gained access to network 216. The analog sensed information may be provided to converter 206 for conversion of the analog data into secondary or calculated VSHIs. For example, laser sensor data may be used to determine RPMs of the centrifuge or still or video images may be processed by software to compute rotation speed and temperature of a centrifuge.

Converter 206 may be configured to process the analog sensor data that are received over secondary channel 214 from analog sensors through cognitive analysis so as to create secondary or calculated VSHIs (also referred to a "secondary or calculated parameters"). For example, analog data from an ultrasonic sensor may be digitized and converted to RPMs, which represents a secondary source of RPM data for monitored equipment 202 that are calculated using different means. Converter 206 may include hardware and logic to convert analog sensor information into secondary operational parameters or secondary VSHIs for monitored equipment 202. The secondary operational parameters may be another source of VSHIs for monitored equipment 202 that include same operating parameters as those of the primary or measured VSHIs. The secondary VSHIs determine similar operational parameters of monitored equipment 202 that are communicated over the secondary channel 214. As the secondary channel 214 is not associated with primary VSHI information, the secondary channel 214 may be insulated from any malware attacks.

Comparator system 208 may be configured to analyze and compare the primary and secondary VSHIs that are received over primary and secondary channels 212, 214, respectively, so as to determine a discrepancy in operation of monitored equipment 202. Based on the comparison of the primary and secondary VSHIs, an alert 218 may be provided to control system 210. The alert may be indicative of a malware threat to monitored equipment 202 which may conceal or amend actual values of primary or measured VSHIs over primary channel 212.

In an embodiment, comparator system 208 may include similar lockstep hardware that was discussed above in relation to FIG. 1 so as to process the VSHIs received over primary and secondary channels 212, 214 and determine if a discrepancy exists in the received information. If secondary VSHI on secondary channel 214 is greater or lesser than an acceptable range of predetermined VSHIs stored in one or more memories, an alert may be provided to control system 210. Alternatively, or in addition to determining the acceptable range of values, if the difference between primary VSHIs and secondary VSHIs are greater than a threshold, an alert 218 may also be provided. The alert may be indicative of a malware threat to monitored equipment 202.

Control system 210 is configured to manage, command, direct or regulate the behavior of monitored equipment 202. In an embodiment, control system 210 can include a supervisory control and data acquisition (SCADA) system that may control operation of monitored equipment 202. Control system 210 may receive primary VSHIs on primary channel 212 during operation of monitored equipment 202 and may regulate the behavior of monitored equipment 202 in response to the primary VSHIs. Control system 210 may also receive alerts from comparator system 208 and may shut down or take other action on the monitored equipment 202 in response to the alerts that are received from comparator system 208.

Figure 3:
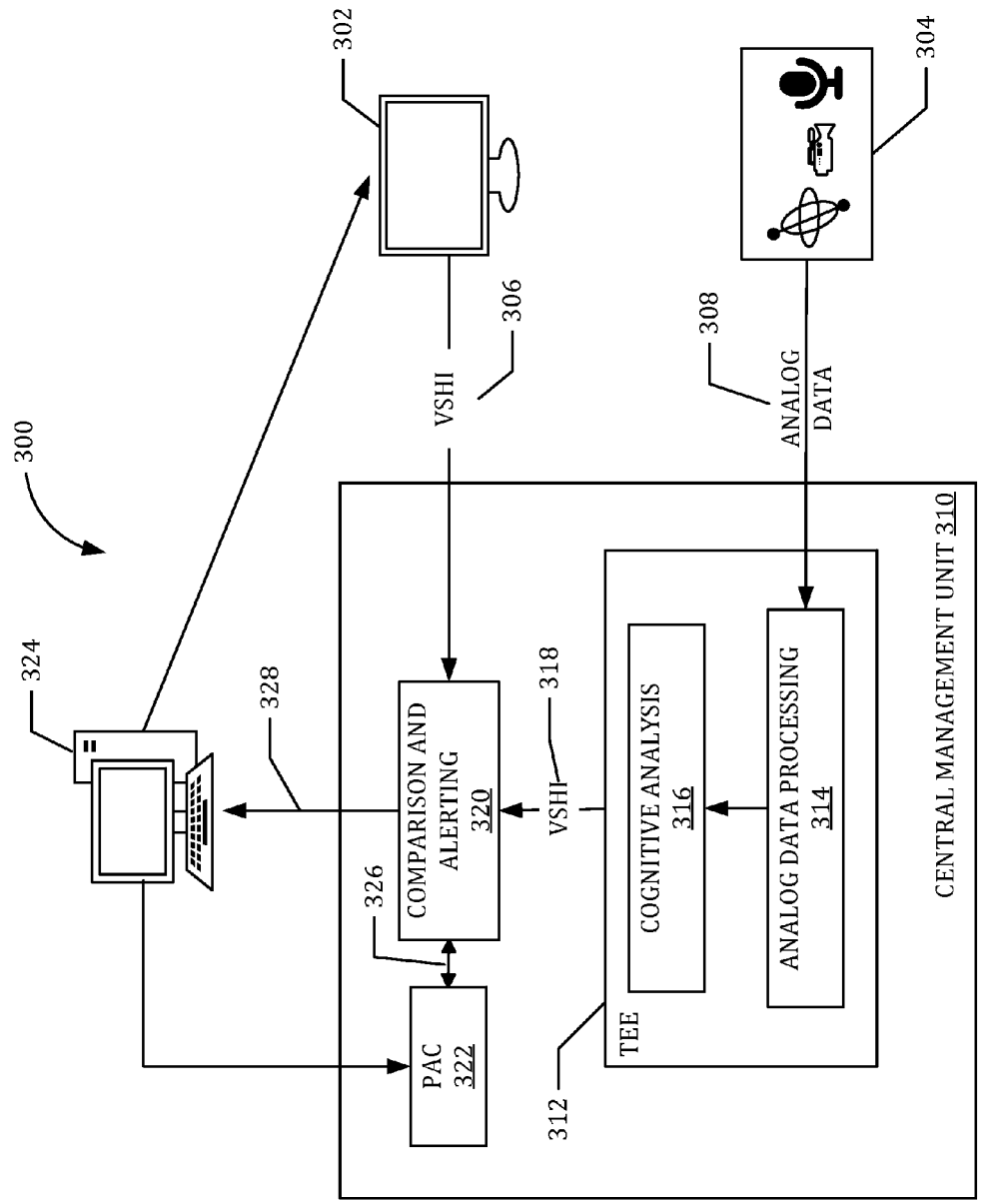
FIG. 3 is a system architecture for performing cognitive protection using a trusted execution environment according to one embodiment.

FIG. 3 illustrates a conceptual system architecture 300 that may be used for cognitive protection of an industrial system such as, for example, protection of systems 100 and 200 depicted in FIGS. 1-2 according to an embodiment. System architecture 300 may be used for monitoring a SCADA-based industrial system and may include a primary monitoring system (PMS) 302, a secondary monitoring system (SMS) 304, a central management unit (CMU) 310 and a backup management system (BMU) 324.

PMS 302 may include a SCADA system for controlling, directing and regulating operation of an industrial system (not shown). PMS 302 may include primary sensors for measuring operational parameters of the industrial system and providing a set of primary or measured VSHIs 306 to CMU 310. The measured VSHIs 306 may be transmitted over one or more primary channels. In an embodiment, the primary channels may be connected to a network (not shown).

SMS 304 may include analog sensors that are associated with monitoring one or more operational parameters of the industrial system (not shown). In embodiments, analog sensors can include audio sensors, video sensors, pressure sensors, ultrasound sensors or the like that are configured to measure operational parameters of the industrial system and communicate the sensor data as analog data 308 to a CMU 310. Analog data 308 may be communicated to CMU 310 over one or more independent secondary channels that can be connected to a network. In embodiments, primary and secondary channels may be wired connections to CMU 310 or may be wireless.

CMU 310 includes hardware with processors, one or more memories and algorithms so as to process the analog data 308 and the measured VSHIs 306 that are received from SMS 304 and PMS 302, respectively. CMU 310 may independently determine calculated VSHIs 318 that are received from SMS 304 as well as compare the measured and calculated VSHIs 306, 318 to determine if there is a discrepancy. In an embodiment, CMU 310 includes an optional trusted execution environment (TEE) 312 that may communicate with comparison and alerting module 320 and programmable automation controllers (PACs) 322. TEE 312 defines a safe, isolated execution space within CMU 310 that provides an added level of security against malware threats that may have attacked the network. TEE 312 may include analog data processing module 314 and cognitive analysis module 316. Analog data processing module 314 may process the analog data 308 to convert the information into digital format. For example, analog data 308 from an ultrasonic sensor may be digitized in module 314. Also, a cognitive analysis module 316 may receive the digital information from analog data processing module 314 and determine a set of calculated or secondary VSHIs 318. The calculated VSHIs represent operational parameters of the industrial system (not shown) that include same operating parameters as those of the primary VSHIs but which are calculated using cognitive analysis. As discussed above with reference to FIG. 1, any malware threats may find it very difficult to target both these primary and secondary channels within system 300 and compromise the information, therein.

Comparison and alerting module 320 may be configured to analyze and compare the measured VSHIs and calculated VSHIs 306, 318 so as to determine a discrepancy in operational parameters of industrial system. Based on the comparison of the measured and calculated VSHIs 306, 318, comparison and alerting module 320 may provide an alert 328 to BMU 324. The alert 328 may be indicative of a malware threat to the industrial system by targeting measured VSHIs 306. In an embodiment, comparison and alerting module 320 may determine if calculated VSHIs 318 are greater or lesser than measured VSHIs 306 or within a range of values or, alternatively, if calculated VSHIs 318 are greater or lesser than predetermined or stored historic measured VSHIs. In response to this determination, an alert 328 may be provided to BMU 324.

PAC 322 includes processor and software that is configured to receive alerts 326 from comparison and alerting module 320. In an embodiment, PAC 322 may include tolerance thresholds that control operation of industrial system including shut-down of industrial system in response to exceeding tolerance thresholds BMU 324 is configured to manage, command, direct or regulate the behavior of industrial system in response to receiving alerts and/or calculated and measured VSHIs 318, 306 from CMU 310. In an embodiment, BMU 324 may communicate signals and/or data to PAC 322 and PMS 302 so as to communicate supervisory commands to industrial system.

Figure 4:
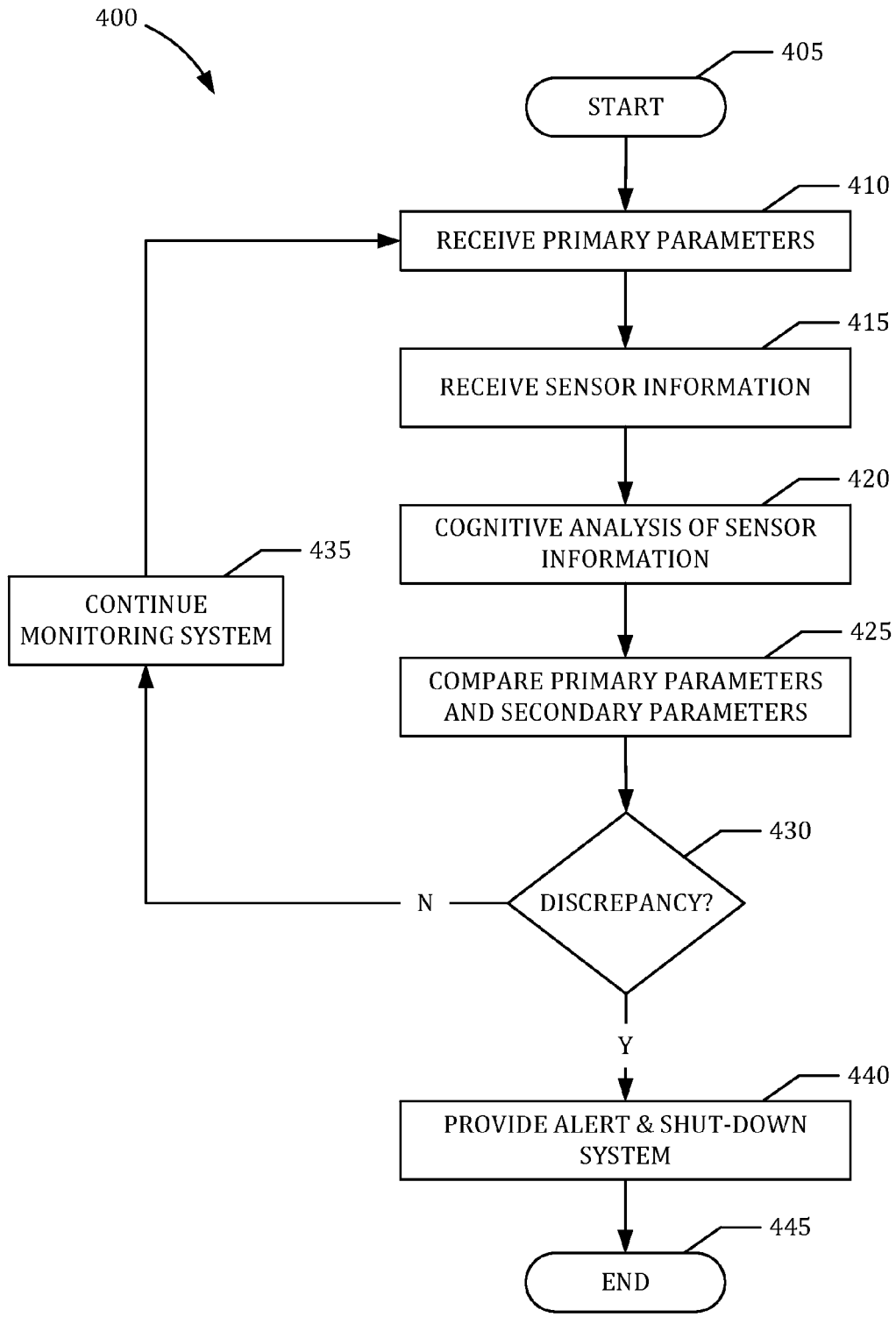
FIG. 4 is a flowchart illustrating a technique for cognitive protection of a system according to one embodiment.

FIG. 4 is a flowchart illustrating a process 400 that may be used for cognitive protection of industrial and non-industrial systems 100-300 depicted in FIGS. 1-3, according to an embodiment of the invention.

Process 400 begins in step 405. In 410, digital sensors connected to the system may determine primary parameters or variables of the system. In an embodiment, system may be a monitored critical or non-critical system that is connected to a network and having a plurality of IOT devices associated with the digital sensors. The primary parameters may include primary VSHIs that are measured by the digital sensors and which are transmitted over one or more primary channels to a comparison module, for example, comparison and alerting module 320 (FIG. 3).

In 415, analog sensors connected to the system may measure secondary sensor parameters and/or variables of the system. The sensor parameters are transmitted as analog sensor data over one or more secondary channels to cognitive analysis module, for example, cognitive analysis module 316 of FIG. 3.

In 420, cognitive analysis may be used on the analog sensor data to calculate or derive a set of secondary or calculated parameters of the system. The secondary parameters may include secondary VSHIs that represent same operating parameters as those of the primary VSHIs but which are calculated through the use of independent sensors and cognitive analysis. The secondary parameters thus calculated are sent to the comparison module.

In 425, the comparison module, for example, comparison and alerting module 320 (FIG. 3) processes the primary and secondary parameters to determine if there is a discrepancy in the primary and secondary parameters that are received for the system. As any malware threat to the industrial or non-industrial system 100-300 may target the digital sensors and/or primary channels that are used to measure primary VSHIs of the system, the secondary channels are not used to communicate primary VSHI and are thus not able to be compromised by malware threats.

In 430, if there is a discrepancy (i.e., step 430="Y"), then, in step 440, the discrepancy is flagged and an alert may be sent to an actuator system, for example, to PAC 322 (FIG. 3) and/or to a backup management system such as, for example, BMU 324 (FIG. 3). In an embodiment, PAC 322 may shut-down the system in response to receiving the alert 322. Other actions may be taken by the PAC 322 in addition to or instead of shutting down the system.

However, in 430, if there is no discrepancy in the primary and secondary parameters (i.e., step 430="N"), then, in 435, digital sensors and analog sensors may continue monitoring operation of the system. Step 440 ends in step 445.

Figure 5:
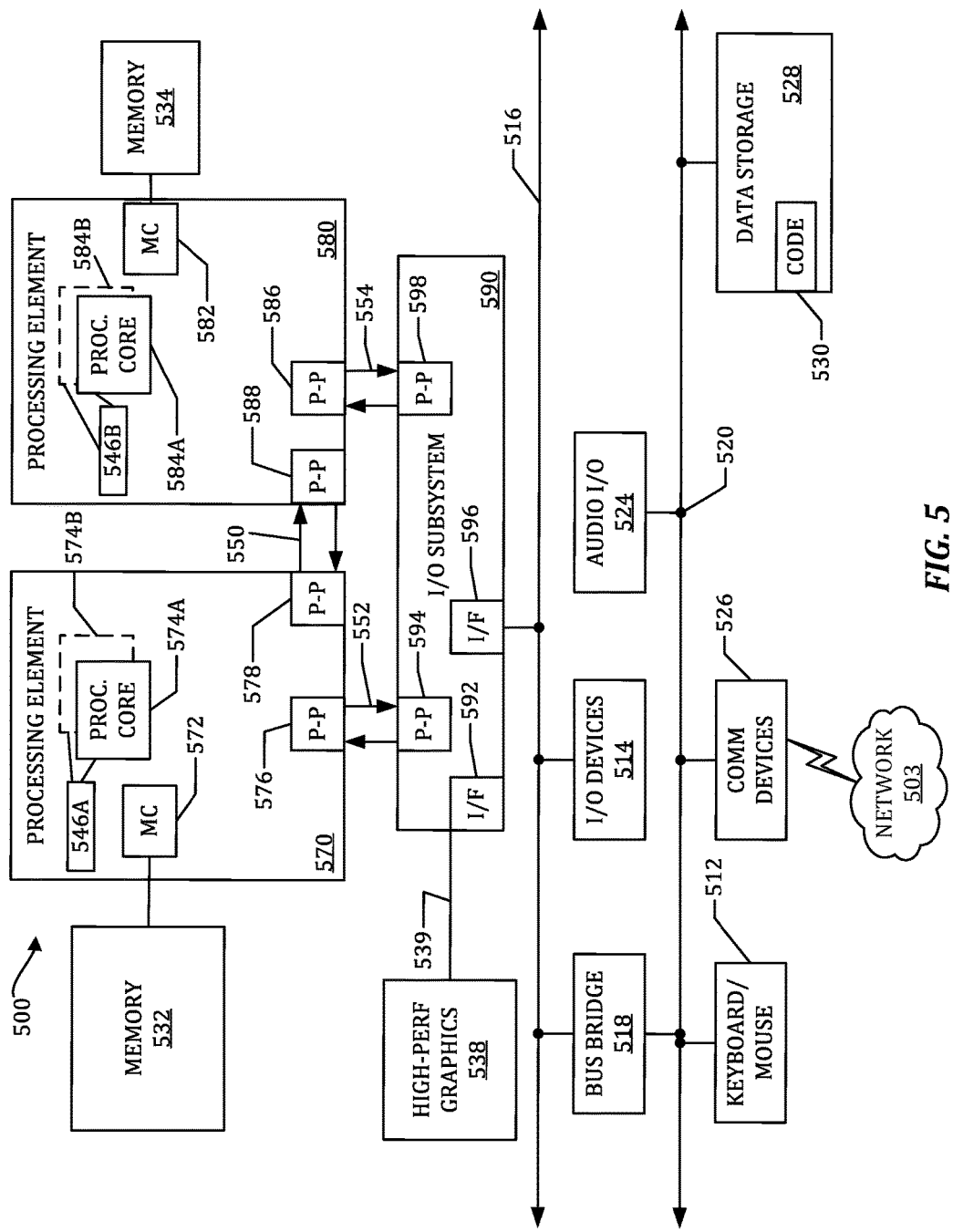
FIG. 5 is a diagram illustrating a computing device for use with techniques described herein according to one embodiment.

Referring now to FIG. 5, a block diagram illustrates a programmable device 500 that may be used within systems 100-300 of FIGS. 1-3 in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 which may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 520.

Note that other embodiments are contemplated. For example, instead of the point-to-point architecture of FIG. 5, a system may implement a multi-drop bus or another such communication topology. Although links 516 and 520 are illustrated as busses in FIG. 4, any desired type of link may be used. Also, the elements of FIG. 5 may alternatively be partitioned using more or fewer integrated chips than illustrated in FIG. 5.

Figure 6:
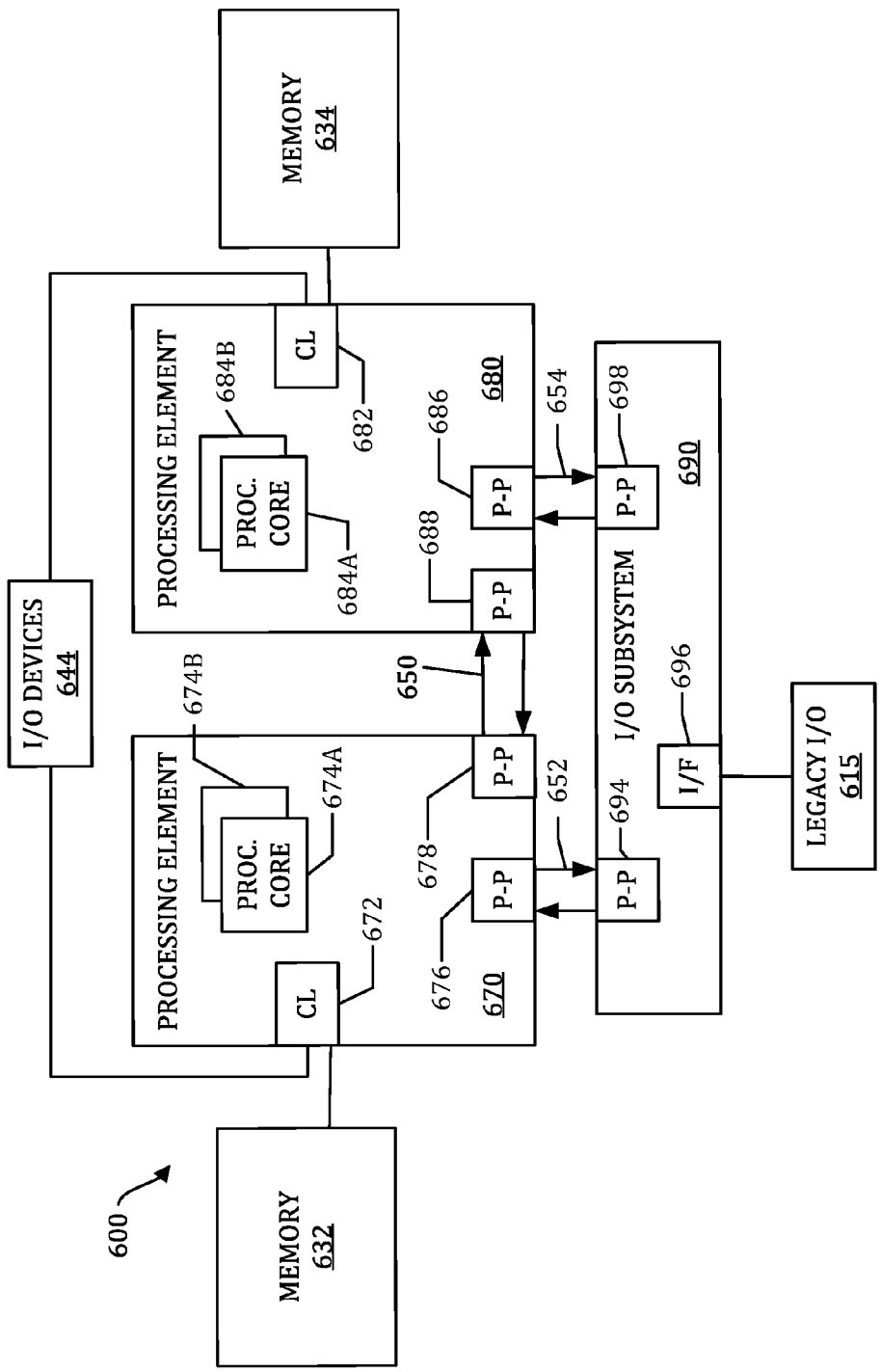
FIG. 6 is a block diagram illustrating a computing device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the 672, 682 but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 5 as processor cores 674A, 674B, 684A and 684B. As illustrated in FIG. 6, I/O subsystem 690 includes P-P interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

Figure 7:
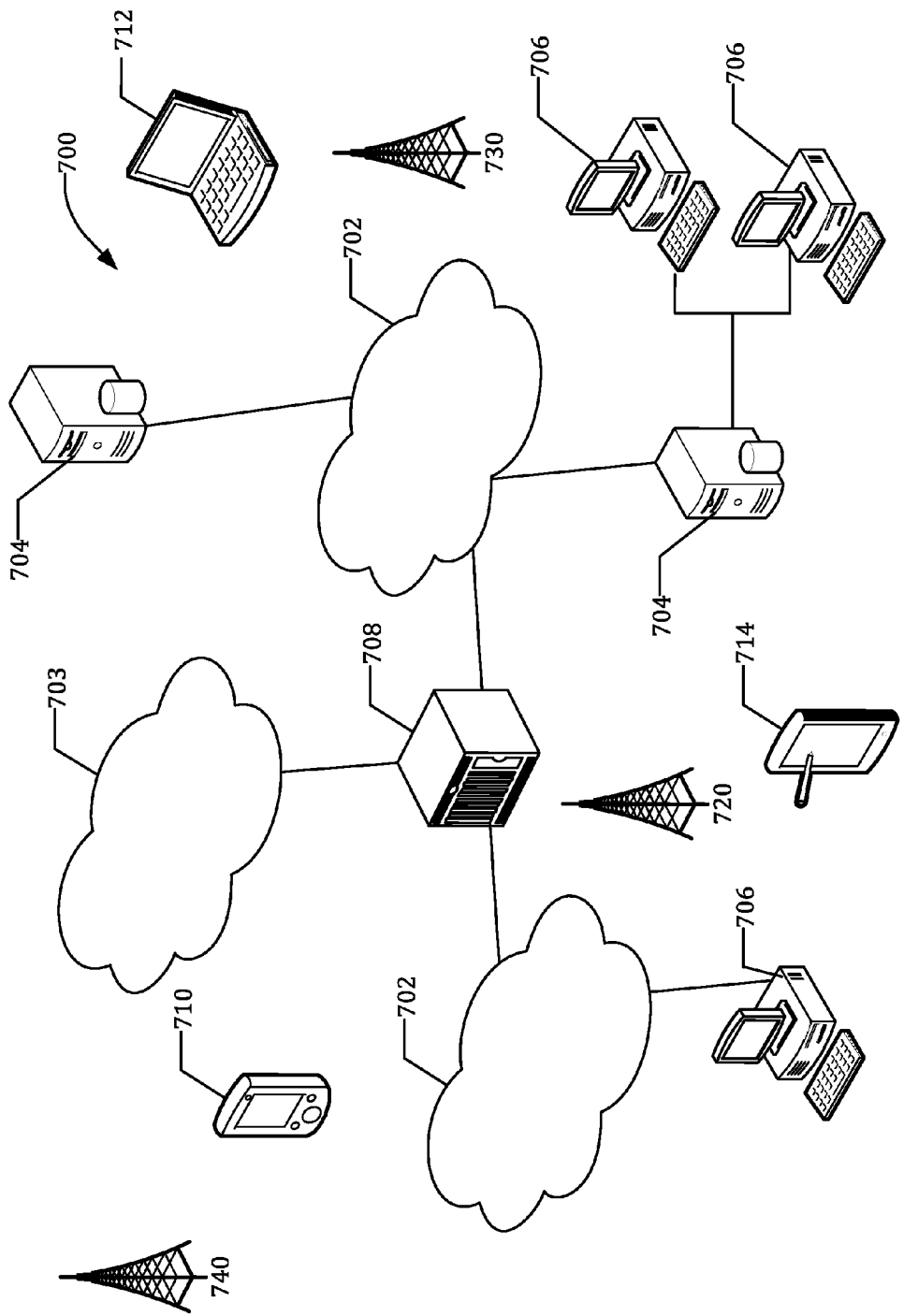
FIG. 7 is a diagram illustrating a network of programmable devices according to one embodiment.

Referring now to FIG. 7, an example infrastructure in which techniques described above may be implements is illustrated schematically. Infrastructure 700 contains computer networks 702. Computer networks 702 may include many different types of computer networks available today, such as the Internet, a corporate network or a Local Area Network (LAN). Each of these networks can contain wired or wireless programmable devices and operate using any number of network protocols (e.g., TCP/IP). Networks 702 may be connected to gateways and routers (represented by 708), end user computers 706 and computer servers 704. Infrastructure 700 also includes cellular network 703 for use with mobile communication devices. Mobile cellular networks support mobile phones and many other types of mobile devices. Mobile devices in the infrastructure 700 are illustrated as mobile phones 710, laptops 712 and tablets 714. A mobile device such as mobile phone 710 may interact with one or more mobile provider networks as the mobile device moves, typically interacting with a plurality of mobile network towers 720, 730 and 740 for connecting to the cellular network 703. Although referred to as a cellular network in FIG. 7, a mobile device may interact with towers of more than one provider network, as well as with multiple non-cellular devices such as wireless access points and routers 708. In addition, the mobile devices 710, 712 and 714 may interact with non-mobile devices such as computers 704 and 706 for desired services, which may include cognitive analysis of analog sensor data described above. The functionality of the systems 100-300 (FIGS. 1-3) may be implemented in any device or combination of devices illustrated in FIG. 7; however, most commonly is implemented in a firewall or intrusion protection system in a gateway or router.

The following examples pertain to further embodiments.

Example 1 is a computer system for cognitive protection of a control system, comprising: one or more processors; one or more memories coupled to the one or more processors, on which are stored instructions, comprising instructions that when executed cause one or more of the processors to: receive first monitored information from digital sensors over a first channel for a control system, wherein the first monitored information is digital information and includes at least one primary parameter of the control system; receive second monitored information from analog sensors over a second channel for the control system, the second monitored information being analog information, and wherein the second channel is independent of the first channel; determine at least one secondary parameter for the control system responsive to receiving the second monitored information, wherein the at least one secondary parameter is digital information; determine a discrepancy in the at least one primary parameter; and provide an alert responsive to a positive determination of a discrepancy in the at least one primary parameter; wherein the digital sensors and the analog sensors are associated with the control system.

In Example 2, the subject matter of Example 1 can optionally include, wherein the instructions further comprise instructions that when executed cause the one or more of the processors to perform cognitive analysis on the second monitored information.

In Example 3, the subject matter of Example 1-2 can optionally include, wherein the instructions further comprise instructions that when executed cause the one or more of the processors to determine a difference between the at least one primary parameter and the at least one secondary parameter.

In Example 4, the subject matter of Example 1-3 can optionally include, wherein the instructions further comprise instructions that when executed cause the one or more of the processors to compare the at least one secondary parameter with one or more historical or predetermined operational parameters.

In Example 5, the subject matter of Example 1-4 can optionally include, wherein the at least one secondary parameter and the at least one primary parameter include the same operating parameter.

In Example 6, the subject matter of Example 1-5 can optionally include, wherein each of at least one primary parameter and the at least one secondary parameter comprises a vital system health indicator.

In Example 7, the subject matter of Example 1-6 can optionally include, wherein the instructions further comprise instructions that when executed cause the one or more of the processors to shut-down the control system responsive to receiving the notification.

Example 8 is a method for cognitive protection of a control system, comprising: receiving first monitored information from primary sensors over a first channel, wherein the first monitored information includes at least one primary parameter of the control system; receiving second monitored information from secondary sensors over a second channel for the control system, wherein the second channel is independent of the first channel; determining at least one secondary parameter for the control system responsive to receiving the second monitored information; determining a discrepancy in the at least one primary parameter; and providing an alert when there is a discrepancy in the at least one primary parameter; wherein the primary sensors and the secondary sensors are associated with the control system.

In Example 9, the subject matter of Example 8 can optionally include, further comprising performing cognitive analysis on the second monitored information.

In Example 10, the subject matter of Example 8-9 can optionally include, further comprising determining a difference between the at least one primary parameter and the at least one secondary parameter.

In Example 11, the subject matter of Example 8-10 can optionally include, further comprising comparing the at least one secondary parameter with one or more historical or predetermined operational parameters.

In Example 12, the subject matter of Example 8-11 can optionally include, further comprising determining the at least one secondary parameter includes the same operating parameter as the at least one primary parameter.

In Example 13, the subject matter of Example 8-12 can optionally include, wherein each of at least one primary parameter and the at least one secondary parameter comprises a vital system health indicator.

In Example 14, the subject matter of Example 8-13 can optionally include, further comprising shutting-down the control system responsive to providing the alert.

Example 15 is a method for cognitive protection of a control system, comprising: receiving first monitored information, wherein the first monitored information includes at least one primary parameter of the control system; determining second monitored information, wherein the second monitored information includes at least one secondary parameter for the control system; determining a discrepancy in the at least one primary parameter; and communicating an alert when there is a discrepancy in the at least one primary parameter; transmitting a command to shut-down the control system responsive to receiving the alert; wherein the primary sensors and the secondary sensors are associated with the control system.

In Example 16, the subject matter of Example 15 can optionally include, further comprising determining the second information by cognitive analysis of analog sensor data obtained for the control system.

In Example 17, the subject matter of Example 15-16 can optionally include, further comprising determining a value that is a difference between the at least one primary parameter and the at least one secondary parameter.

In Example 18, the subject matter of Example 15-17 can optionally include, further comprising determining the discrepancy based on a comparison of the at least one secondary parameter with one or more historical or predetermined operational parameters.

In Example 19, the subject matter of Example 15-18 can optionally include, wherein the at least one secondary parameter and the at least one primary parameter include the same operating parameter.

In Example 20, the subject matter of Example 15-19 can optionally include, wherein each of at least one primary parameter and the at least one secondary parameter comprises a vital system health indicator.

In Example 21, the subject matter of Example 15-20 can optionally include, wherein the at least one primary parameter and the at least one secondary parameter includes digital information.

Example 22 is one or more machine readable media, on which are stored instructions, comprising instructions that when executed by a processor cause a machine to: receive first monitored information from digital sensors over a first channel for a control system, wherein the first monitored information is digital information and includes at least one primary parameter of the control system; receive second monitored information from analog sensors over a second channel for the control system, the second monitored information being analog information, and wherein the second channel is independent of the first channel; determine at least one secondary parameter for the control system responsive to receiving the second monitored information, wherein the at least one secondary parameter is digital information; determine a discrepancy in the at least one primary parameter; and provide an alert responsive to a positive determination of a discrepancy in the at least one primary parameter; wherein the digital sensors and the analog sensors are associated with the control system.

In Example 23, the subject matter of Example 22 can optionally include, wherein the instructions to determine the at least one secondary parameter further comprises instructions that when executed cause the machine to perform cognitive analysis on the second monitored information.

In Example 24, the subject matter of Example 22-23 can optionally include, wherein the instructions to determine the discrepancy further comprises instructions that when executed cause the machine to determine a difference between the at least one primary parameter and the at least one secondary parameter.

In Example 25, the subject matter of Example 22-24 can optionally include, wherein the instructions to determine the discrepancy further comprises instructions that when executed cause the machine to compare the at least one secondary parameter with one or more historical or predetermined operational parameters.

In Example 26, the subject matter of Example 22-25 can optionally include, wherein the at least one secondary parameter and the at least one primary parameter include the same operating parameter.

In Example 27, the subject matter of Example 22-26 can optionally include, wherein each of at least one primary parameter and the at least one secondary parameter comprises a vital system health indicator.

In Example 28, the subject matter of Example 22-27 can optionally include, wherein the primary sensors are digital sensors and the secondary sensors are analog sensors.

In Example 29, the subject matter of Example 22-28 can optionally include, wherein the instructions further comprise instructions that when executed cause the machine to shut-down the control system responsive to receiving the notification.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed by a processor cause a machine to:

receive first monitored information from digital sensors over a first channel for a control system, wherein the first monitored information is digital information and includes at least one primary parameter of the control system;

receive second monitored information from analog sensors over a second channel for the control system, the second monitored information being analog information, and wherein the second channel is independent of the first channel;

determine at least one secondary parameter for the control system responsive to receiving the second monitored information, wherein the at least one secondary parameter is digital information;

detect a difference between the at least one primary parameter and the at least one secondary parameter; and provide an alert responsive to detecting the difference, wherein the digital sensors and the analog sensors are associated with the control system.

2. The machine readable medium of claim 1, wherein the instructions to determine the at least one secondary parameter further comprises instructions that when executed cause the machine to perform cognitive analysis on the second monitored information.

3. The non-transitory machine readable medium of claim 1, wherein the instructions to receive a second monitored information and determine at least one secondary parameter are executed in an isolated execution environment.

4. The machine readable medium of claim 1, wherein the instructions to detect the difference further comprises instructions that when executed cause the machine to compare the at least one secondary parameter with one or more historical or predetermined operational parameters.

5. The machine readable medium of claim 1, wherein the at least one secondary parameter and the at least one primary parameter include the same operating parameter.

6. The machine readable medium of claim 1, wherein each of at least one primary parameter and the at least one secondary parameter comprises a vital system health indicator.

7. The machine readable medium of claim 1, wherein the instructions further comprise instructions that when executed cause the machine to shut-down the control system responsive to receiving the alert.

8. A computer system for cognitive protection of a control system, comprising:
one or more processors;
a memory coupled to the one or more processors, on which are stored instructions, comprising instructions that when executed cause one or more of the processors to:
receive first monitored information from digital sensors over a first channel for a control system, wherein the first monitored information is digital information and includes at least one primary parameter of the control system;
receive second monitored information from analog sensors over a second channel for the control system, the second monitored information being analog information, and wherein the second channel is independent of the first channel;
determine at least one secondary parameter for the control system responsive to receiving the second monitored information, wherein the at least one secondary parameter is digital information;
detect a difference between the at least one primary parameter and the at least one secondary parameter; and
provide an alert responsive to detecting the difference, wherein the digital sensors and the analog sensors are associated with the control system.

9. The computer system of claim 8, wherein the instructions further comprise instructions that when executed cause the one or more of the processors to perform cognitive analysis on the second monitored information.

10. The computer system of claim 8, wherein the instructions to receive a second monitored information and determine at least one secondary parameter are executed in an isolated execution environment.

11. The computer system of claim 8, wherein the instructions further comprise instructions that when executed cause the one or more of the processors to compare the at least one secondary parameter with one or more historical or predetermined operational parameters.

12. The computer system of claim 8, wherein the at least one secondary parameter and the at least one primary parameter include the same operating parameter.

13. The computer system of claim 8, wherein each of at least one primary parameter and the at least one secondary parameter comprises a vital system health indicator.

14. The computer system of claim 8, wherein the instructions further comprise instructions that when executed cause the one or more of the processors to shut-down the control system responsive to receiving the alert.

15. A method for cognitive protection of a control system, comprising:
receiving first monitored information from digital sensors over a first channel for a control system, wherein the first monitored information is digital information and includes at least one primary parameter of the control system;
receiving second monitored information from analog sensors over a second channel for the control system, the second monitored information being analog information, and wherein the second channel is independent of the first channel;
determining at least one secondary parameter for the control system responsive to receiving the second monitored information, wherein the at least one secondary parameter is digital information;
detecting a difference between the at least one primary parameter and the at least one secondary parameter; and
providing an alert responsive to detecting the difference, wherein the digital sensors and the analog sensors are associated with the control system.

16. The method of claim 15, further comprising performing cognitive analysis on the second monitored information.

17. The method of claim 15, wherein receiving a second monitored information and determining at least one secondary parameter occur in an isolated execution environment.

18. The method of claim 15, wherein detecting a difference further comprises comparing the at least one secondary parameter with one or more historical or predetermined operational parameters.

19. The method of claim 15, wherein detecting a difference further comprises determining the at least one secondary parameter includes the same operating parameter as the at least one primary parameter.

20. The method of claim 15, wherein each of at least one primary parameter and the at least one secondary parameter comprises a vital system health indicator.

21. The method of claim 15, further comprising shutting-down the control system responsive to providing the alert.

* * * * *